United States Patent
Streete et al.

(10) Patent No.: US 10,785,219 B1
(45) Date of Patent: Sep. 22, 2020

(54) METHODS, SYSTEMS, AND COMPUTER READABLE MEDIUMS FOR SECURELY ESTABLISHING CREDENTIAL DATA FOR A COMPUTING DEVICE

(71) Applicant: VCE Company, LLC, Richardson, TX (US)

(72) Inventors: Jonathan Peter Streete, San Jose, CA (US); Christopher Michael Davis, Frisco, TX (US)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 735 days.

(21) Appl. No.: 14/942,332

(22) Filed: Nov. 16, 2015

(51) Int. Cl.
 *G06F 21/00* (2013.01)
 *H04L 29/06* (2006.01)

(52) U.S. Cl.
 CPC .............................. *H04L 63/0876* (2013.01)

(58) Field of Classification Search
 USPC ........................................................... 726/6
 See application file for complete search history.

(56) References Cited

U.S. PATENT DOCUMENTS

| | | | | |
|---|---|---|---|---|
| 8,868,694 | B2* | 10/2014 | Dattagupta | H04L 12/2807 709/219 |
| 9,055,055 | B1* | 6/2015 | Strand | H04L 63/0815 |
| 9,143,886 | B1* | 9/2015 | Abou-El-Ella | H04W 4/50 |
| 9,684,539 | B1* | 6/2017 | Cuthrell | G06F 8/65 |
| 2003/0163566 | A1* | 8/2003 | Perkins | G06F 21/335 709/225 |
| 2008/0260149 | A1* | 10/2008 | Gehrmann | G06Q 20/3821 380/247 |
| 2010/0263032 | A1* | 10/2010 | Bhuyan | H04L 63/168 726/7 |
| 2013/0036458 | A1* | 2/2013 | Liberman | H04L 9/3231 726/6 |
| 2013/0157637 | A1* | 6/2013 | Bos | H04W 4/001 455/418 |
| 2013/0290572 | A1* | 10/2013 | Dalal | G06F 13/102 710/19 |
| 2015/0006898 | A1* | 1/2015 | Mizikovsky | H04W 12/04 713/176 |
| 2017/0026187 | A1* | 1/2017 | Ramatchandirane | H04L 63/0876 |

* cited by examiner

*Primary Examiner* — Harris C Wang
(74) *Attorney, Agent, or Firm* — Jenkins, Wilson, Taylor & Hunt, P.A.

(57) ABSTRACT

Methods, systems, and computer readable mediums for securely establishing credential data for a computing device are disclosed. According to one example, a method includes assigning, by a credential manager, credential set data to a computing device and mapping the credential set data to a device identifier key associated with the computing device in a credential data store accessible by the credential manager. The method further includes receiving, from a provisioning service client, a credential set request message including the device identifier key by the credential manager in response to an activation of the computing device at a customer location site and sending, by the credential manager to the provisioning service client, the credential set data for authenticating the computing device at the customer location site.

20 Claims, 5 Drawing Sheets

| MODEL NUMBER | SERIAL NUMBER | INITIAL USERNAME | INITIAL PASSWORD |
|---|---|---|---|
| ABC448 | 2345VB5E41 | 6724525445 | ICESTORM |
| SMI464 | 73KL75E451 | PINECONE | 776PW46798 |
| SMP332 | C2ON87FG32 | G7HJ3L3923 | 78D97JI3MP4JR46 |
| SMP441 | C2ON87FG41 | VI73GE08K3 | TIL75E4PE0GE |
| VMPP23 | 37ME9T8C23 | D97JI3SK4B | DI7M5E96CE |
| VMPP34 | 37ME9T8C34 | MRI4$SK#KS | GUE8F52MJS |
| HT659 | 45UDG2574 | 832312LK7N | 6894237956 |

METHODS, SYSTEMS, AND COMPUTER READABLE MEDIUMS FOR SECURELY ESTABLISHING CREDENTIAL DATA FOR A COMPUTING DEVICE

TECHNICAL FIELD

The subject matter described herein relates to the designating and provisioning of credential information for computing device and components. More specifically, the subject matter relates to methods, systems, and computer readable mediums for securely establishing credential data for a computing device.

BACKGROUND

Presently, information technology (IT) equipment devices are commonly manufactured with default username and default password combinations that enable a customer user to install and configure an IT equipment device upon its delivery to the user's location. In many cases, default credential set data combinations are available in online forums or other forms of publication to the detriment of the security of the computing. Manufacturers expect customer users to change the default credentials when the equipment device is activated and/or fully installed. In many instances though, customer users fail to reset the default credentials of the equipment device or fail to delete the default account when adding new user accounts. Such scenarios expose the equipment device to unsophisticated attacks by unauthorized parties (e.g., either within the supply chain or via network access) that threaten the security of the target device and/or associated network system.

SUMMARY

Methods, systems, and computer readable mediums for securely establishing credential data for a computing device are disclosed. According to one embodiment, a method includes assigning, by a credential manager, credential set data to a computing device and mapping the credential set data to a device identifier key associated with the computing device in a credential data store accessible by the credential manager. The method further includes receiving, from a provisioning service client, a credential set request message including the device identifier key by the credential manager in response to an activation of the computing device at a customer location site and sending, by the credential manager to the provisioning service client, the credential set data for authenticating the computing device at the customer location site.

BRIEF DESCRIPTION OF THE DRAWINGS

The subject matter described herein will now be explained with reference to the accompanying drawings of which:

FIG. 2 illustrates an exemplary database table containing credential set data mappings in accordance with embodiments of the subject matter described herein;

DETAILED DESCRIPTION

The subject matter described herein discloses methods, systems, and computer readable mediums for securely establishing credential data for a computing device. Notably, the disclosed subject matter affords a system that effectively prevents security attacks that are directed to utilize default credential settings. In particular, the disclosed subject matter eliminates the need for (and the presence of) default credentials in a newly manufactured, assembled, and/or integrated computing device (e.g., an IT equipment device), thereby preventing an unauthorized user from using the default credentials (e.g., default usernames and/or default passwords) to install a rootkit or otherwise gain unauthorized access to the computing. Accordingly, any unauthorized access of a computing device while in the supply chain (e.g., in transit) or after installation at the customer location site can be eliminated. In addition, without any default credentials initially provisioned on a computing device, a customer user is further compelled upon the installation and/or activation of the device to establish new credential set data, which will be unknown and therefore ensure the computing device is unavailable to unauthorized users.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
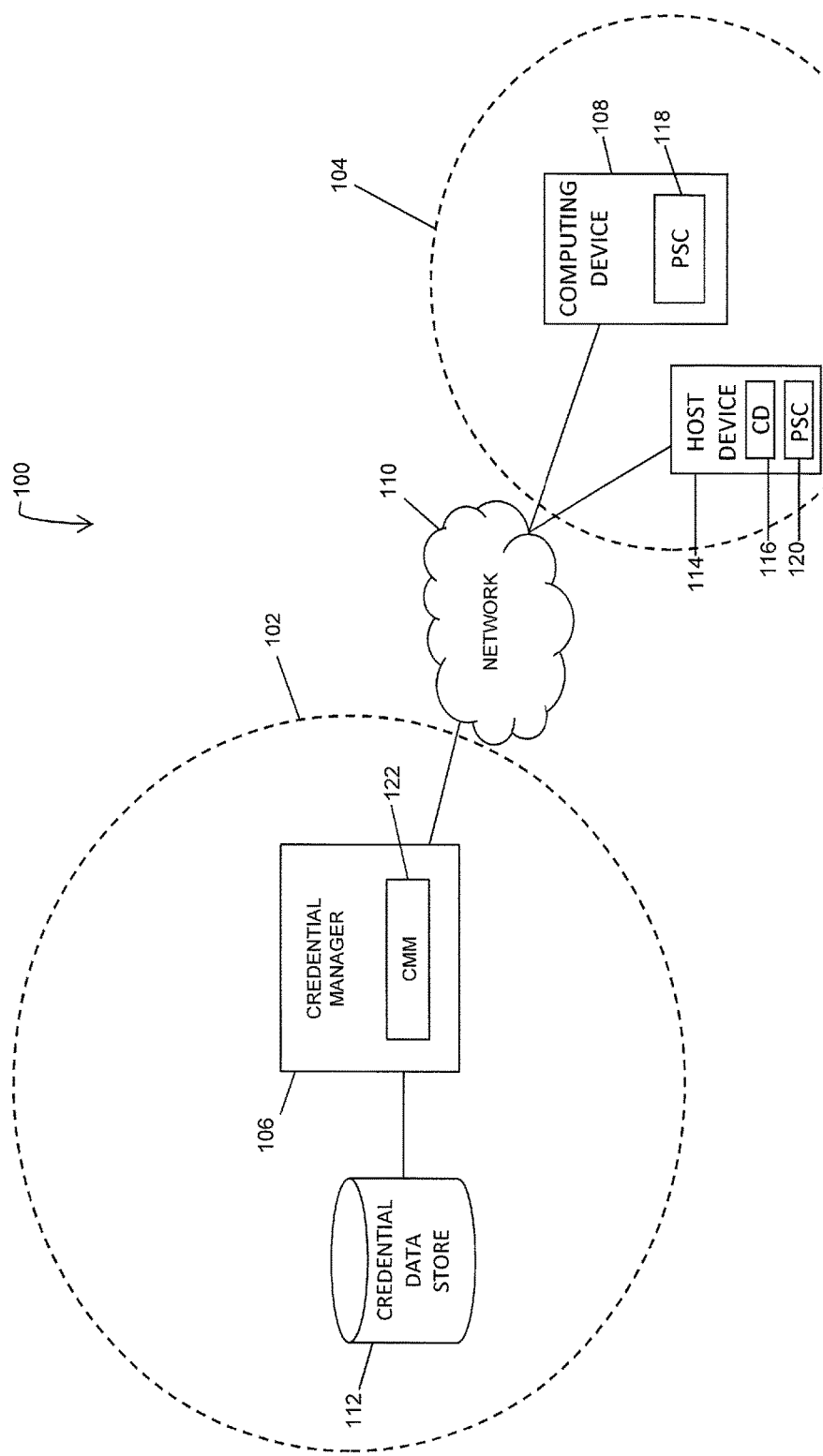
FIG. 1 illustrates an exemplary credential data provisioning system in accordance with embodiments of the subject matter described herein.

FIG. 1 is a block diagram illustrating an exemplary credential data provisioning system, generally designated 100, according to an embodiment of the subject matter described herein. System 100 includes a manufacturer location site 102 and a customer location site 104, which comprise separate and distinct geographical locations. In some embodiments, manufacture location site 102 may be associated with an entity that manufacturers, integrates, and/or assembles computing devices (e.g., IT equipment devices). Manufacturer location site 102 may include any geographical location associated with a manufacturing entity or facility that produces computing devices, such as compute servers, network switches, router devices, storage devices, consumer devices, and the like. In some embodiments, manufacturer location site 102 may include a credential manager 106 that is configured to generate, manage, and distribute credential set data associated with each computing device manufactured, integrated, or assembled by the manufacturing entity and/or at manufacturer location site 102. As used herein, credential set data can include authorization and/or authentication information (e.g., access usernames, access passwords, access cookies, access tokens, cryptographic keys, etc.) pertaining to a computing device.

Credential manager 106 may include at least one physical computer machine that comprises at least one processor and at least one memory (not shown). In some embodiments, the processor can comprise a microprocessor, a central processing unit (CPU), or any other like hardware based processor unit. In some embodiments, credential manager 106 may host a credential management module (CMM) 122 in the memory, which can comprise random access memory (RAM), read only memory (ROM), optical read/write memory, cache memory, magnetic read/write memory, flash memory, or any other non-transitory computer readable medium. Notably, the processor and memory in credential manager 106 can be used to execute and facilitate the operation of CMM 122, which may be configured to execute the algorithm and/or operations set forth in FIG. 5 (see below). For example, CMM 122 may be stored in memory and executed by a processor in credential manager 106. In some embodiments, credential manager 106 may comprise a special purpose credential management server provisioned with CMM 122. In some embodiments, CMM 122 may be provisioned on and/or executed by a physical computer machine that is separate and independent from credential manager 106. For example, credential manager 106 may be configured to generate the credential set data while CMM 122 may be configured to subsequently validate the credential set data.

As shown in FIG. 1, credential manager 106 may also be communicatively connected or linked (e.g., via a communication connection that may be established during the implementation of the credential data and not necessarily in perpetuity) to a credential data store 112 in order to communicate with, access, and/or manage credential data store 112. In some embodiments, credential manager 106 may be configured to generate a log that records any attempt/request to access credential data store 112. Further, credential manager 106 may be configured to eliminate all access by and authorization of a requesting entity after a predefined number unsuccessful access attempts conducted by a requesting entity. In some embodiments, credential data store 112 may comprise a secure database server, a manufacturing vault, or other secured data store device, which may be configured to store credential set data (e.g., unique username and password combinations, access cookies, access tokens, cryptographic keys, etc.). For example, credential data store 112 may comprise any data storage unit (e.g., a database or plurality of databases) that can be configured to function as a centralized credential storage unit for credential manager 106. In some embodiments, credential data store 112 may be configured to store credential information related to the identified computing devices (or infrastructure elements) manufactured by a particular manufacturing entity. Further, the credential set data contained in credential data store 112 may be accessed and obtained by credential manager 106 and/or credential management module 122 for computing device provisioning. Although FIG. 1 depicts credential data store 112 as a local data storage unit residing in manufacturer location site 102, credential data store 112 can also be embodied as a data storage unit located at a non-local distributed content site, on a local proxy server, or on a different network without departing from the scope of the disclosed subject matter. As such, credential data store 112 may be located within and hosted by credential manager 106. In some embodiments, credential data store 112 can comprise any storage medium or storage unit that is configured to store data accessible by the processor of credential manager 106 either via system bus or a local network connection.

In some embodiments, credential manager 106 may be communicatively connected to each of computing device 108 and host device 114 in customer location site 104 via network 110. Network 110 may include any communications network, such as the Internet, that facilitates the communication of signals or messages between credential manager 106 and each of computing devices 108 and 116.

Customer location site 104 may include any geographical site in which a customer user's network infrastructure is located. Although FIG. 1 only depicts a single customer location site, it is understood that system 100 may include additional customer location sites that respectively contain any number of additional computing devices without departing from the scope of the disclosed subject matter. In some embodiments, the customer user's network may include at least one computing device 108 and/or at least one host device 114 that are configured to execute applications and workload services (and related storage and communications) supported by the customer user's network. In some embodiments, computing device 108 may be a stand-alone network infrastructure element that includes, but not limited to, a compute server, network switch, router device, storage device, firewall device, or any other IT equipment device (e.g., that is operated within a data center facility by a system administrator). Similarly, computing device 108 may also include a consumer electronic device such as a home wireless router, a personal computer, a laptop computer, a tablet computer, a smart mobile phone device, and the like. Similarly, host device 114 may include a host server machine that is provisioned with computing devices or infrastructure elements, such as compute components, networking and/or switching components, and data storage components. In some embodiments, customer location site 104 may include one or more host devices 114, such as a converged infrastructure (CI) system. In some embodiments, host device 114 may include a converged infrastructure (CI) system. As used herein, a CI system, such as a Vblock® System from VCE Company, LLC, can comprise multiple computing devices or components in a preconfigured or prepackaged computing platform. For example, host device 114 can include a single computing platform unit associated with racks of physical computing devices and related software for performing virtualization and/or other information technology (IT) functions. In some embodiments, a computing device or component associated with host device 114 can comprise a compute component, a software component, a networking component, a hardware component, or a firmware component. For example, host device 114 can comprise data storage devices, compute devices (e.g., a unified computing system device), networking equipment (e.g., switch devices), and software for managing physical resources and/or virtualized resources (e.g., virtual servers).

In some embodiments, each of host device 114, computing device 116, and computing device 118 may include at least one processor and at least one memory as described above with respect to credential manager 106. In some embodiments, each of provisioning service client 118 and 120 may be stored in memory and executed by a processor. Although FIG. 1 only depicts a single computing device 108 and a single host device 114 supporting a single computing device 116, additional computing devices and host devices may be utilized without departing from the scope of the disclosed subject matter.

In some embodiments, a manufacturing facility or entity may produce or manufacture, assemble, or integrate a computing device at a manufacturing location site 102. Although the present description discloses that the computing device is manufactured by a manufacturing entity located at a site that also includes credential manager 106 for the sake or simplicity, the computing device may be manufactured at any location that is independent from credential manager and is not customer location site 104. Upon completion, the manufactured computing device may be assigned a unique, human readable device identifier key. In some embodiments, the assigned device identifier key may include a combination (e.g., a concatenation) of the device's model number and serial number. In other embodiments, the assigned device identifier key may comprise a randomly generated alphanumeric identifier that is entirely unique to the computing device. The device identifier key may be assigned and provided to credential manager 106 by a system administrator. Alternatively, credential manager 106 may be configured to generate device identifier keys for manufactured computing devices. Likewise, a credential data set is also assigned to the manufactured and/or assembled computing device. In some embodiments, credential manager 106 may be configured to designate the generated credential data set to a particular computing device. For example, credential manager 106 may be configured to assign a random username and password combination to a computing device at the manufacturing facility (e.g., assign the credential data set to a computing device during the assembly process) and subsequently store the random credential set data in credential data store 112. For example, a management tool (e.g., credential manager 106) that is responsible for generating the credential data set may be configured to read the device identifier keys (e.g., model number and serial number) of the manufactured/assembled computing device and record an entry in credential data store 112 that includes both the credential set data and the corresponding device identifier keys. In some embodiments, the random credential set data may be manually assigned by a user entity (e.g., system administrator). Alternatively, credential manager 106 may generate a plurality of random username and password combinations that are provisioned as entries in credential data store 112 and are subsequently mapped to a computing device upon the provisioning of the computing device's device identifier key in credential data store 112. In some embodiments, each of the username and the password of the credential set data generated by credential manager 106 may include a random and unique combination of letters, numbers, and/or punctuation symbols.

After a device identifier key is assigned to a computing device, credential manager 106 may be configured to access credential data store 112 (e.g., via the use of an application programming interface (API)) and store the device identifier key in a database maintained in credential data store 112. In some embodiments, the device identifier key may be mapped to credential set data in credential data store 112. Notably, the credential set data may be a pre-generated credential set data that is presently stored as an entry that is awaiting a corresponding (or mapped) device identifier key from credential manager 106.

For example, credential set data may include a random username and password combination that is stored in credential data store 112 along with the device identifier key for a particular computing device. Further, both the credential set data and the device identifier key may be encrypted for additional security. For example, the credential set data may be encrypted using a public key corresponding to (e.g., belonging to and provided by) the customer user of the computing device. After the credential set data is assigned and recorded in credential data store 112, the associated computing device may be physically transported (e.g., via a supply chain) to customer location site 104.

Upon delivery to customer location site 104, the computing device (e.g., computing device 108 or computing device 116) may subsequently be installed or activated by a system administrator user. In some embodiments, a new computing device may be added to a customer location site to assist with the support of existing workload service or a new workload service supported in the network. For example, when computing device 108 is first activated or powered on at customer location site 104, a provisioning service client 118 included in computing device 108 may be triggered to communicate with credential manager 106 at manufacturing location site 102 via network 110. In some embodiments, the provisioning service client may be supported by a host device instead of the computing device itself (e.g., provisioning service client 120 hosted by host device 114). In some embodiments, provisioning service client 118 may send a credential data request message that includes the device identifier key (either plaintext format or encrypted format) associated with computing device 108. In response, upon receiving the credential data request message, credential manager 106 may be configured to extract the device identifier key and query credential data store 112. For example, credential manager 106 may compare the device identifier key with the model number and serial number combination to locate a matching entry. Upon finding an entry that matches the device identifier key, credential manager 106 may acquire the mapped credential set data (e.g., username and password combination) and subsequently generate a credential data response message that includes the credential set data.

Afterwards, credential manager 106 may send the generated credential data response message to provisioning service client 118 via network 110 using an encrypted connection. Upon receiving the credential response message, provisioning service client 118 may extract the contained credential set data to authenticate access to computing device 108.

In some embodiments, provisioning service client 118 may be configured to ensure that the original credential set data values are reset and/or replaced with credential set data that complies with security policy requirements established by the customer user entity. For example, provisioning service client 118 may be triggered, in response to the successful authentication of computing device 108, to generate a credential data update request that is communicated to a system administrator user (e.g., via a message prompt on a visual GUI display of computing device 108 or host device 114). In some embodiments, provisioning service client 118 may prevent further operation of computing device 118 until the credential set data is reset by the system administrator.

In some embodiments, the disclosed system may implement measures for additional security. For example, credential manager 106 and computing device 108 (or host device 114) may exchange and/or communicate public encryption keys with each other, such that one or more of the device identifier key and the credential set data communicated between these network elements can be encrypted. For example, if the requested credential set data is encrypted with a public key, provisioning service client 118 may decrypt the credential set data utilizing a private key associated with the customer user. This ensures that an unauthorized user or provisioning service that is not under the control of the customer user is unable to obtain the credential set data from credential data store 112 even if the connection to data store 112 or credential data store 112 itself is exposed or susceptible to a security breach by an unauthorized provisioning service.

In some embodiments, each of the credential manager 106 and computing device 108 (or host device 114) may utilize a corresponding private key to decrypt any encrypted format data and/or messages that are received. Alternatively, credential manager 106 may be configured to provide multifactor authentication, such as communicating an email or text message containing either a symmetric key or a one-time password (OTP) symmetric key to a system administrator associated with customer location site 104 for initial decryption via an out of band communications channel.

It will be appreciated that FIG. 1 illustrates an exemplary embodiment and that various devices, their locations, and/or their functions as described above in relation to FIG. 1 may be changed, altered, added, or removed.

FIG. 2 depicts an example database table 200 stored in credential data store 112 that includes a plurality of entries, each of which corresponds to a particular computing device. Notably, each entry of database table 200 includes a device identifier key 202 that is mapped to credential set data 204. In some embodiments, a device identifier key 202 of a particular database entry may include both a model number and serial number associated with a particular computing device. Further, the model number and serial number contained in the database entry is mapped to credential set data 204 that includes a username and password pairing. For example, the first entry in database table 200 may include a device identifier key of ABC4482345VB5E41 (e.g., a concatenation of the model number and serial number) and credential set data comprising 6724525445 and ICESTORM. Each of the device identifier key and the credential set data components may comprise any combination of numbers, letters, and/or symbols (e.g., punctuation symbols). As indicated above, credential manager 106 may be configured to access a database table 200 stored in credential data store 112 using a device identifier key associated with computing device 108 (or computing device 116). In the event a database entry containing a matching device identifier key is found, the corresponding mapped credential set data may be accessed and obtained by credential manager 106. In some embodiments, one or more entries of credential set data 204 may include encrypted credential set data that has been encrypted by credential manager 106 with a public encryption key provided by the customer.

Figure 3:
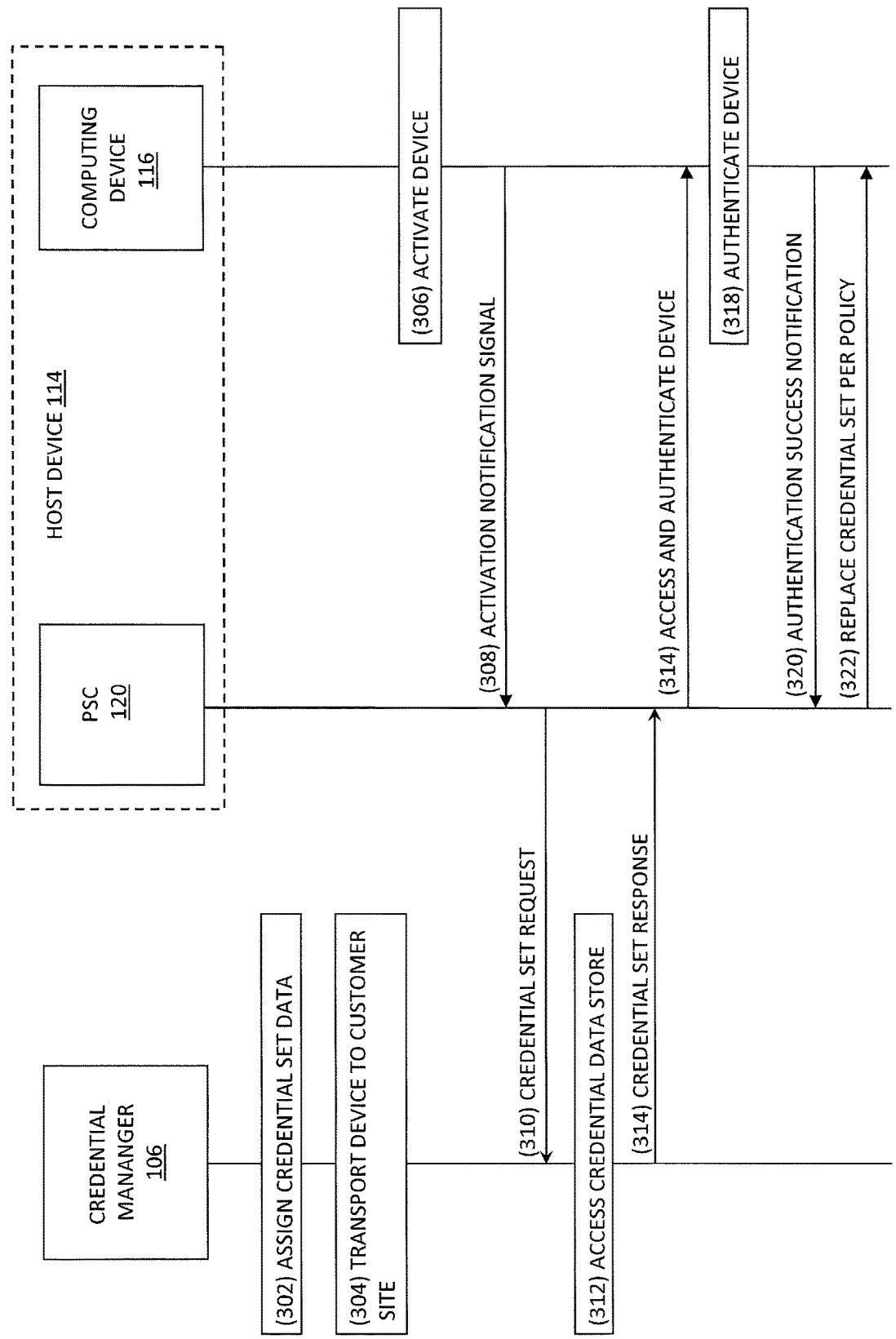
FIG. 3 illustrates exemplary signaling communications for securely establishing credential data for a computing device by a host device in accordance with embodiments of the subject matter described herein.

FIG. 3 exemplary signaling communications for securely establishing credential data for a computing device by a host device in accordance with embodiments of the subject matter described herein. In block 302, a random credential set data is assigned by credential manager 106 to a computing device 116, which is manufactured by a manufacturing entity that manages, operates, and/or is associated with credential manager 106. In some embodiments, credential manager 106 may provision a credential data store with a database entry that maps the generated credential set data (e.g., a unique username and password combination) to a unique device identifier key that may comprise a combination (e.g., a concatenation) of the model number and serial number of computing device 116.

In block 304, computing device 116 is physically transported from the manufacturer's location to a customer location site or facility. Notably, computing device 116 has not been programmed and/or provisioned with default credential set data (e.g., a default username and/or a default password) that may be utilized by an unauthorized user or rogue software (e.g., while in transport to the customer location site via the supply chain or at the customer location/facility itself).

In block 306, computing device 116 is ultimately delivered and installed and/or incorporated into host device 114 in the customer user's network. Upon activation at the customer location site or facility, computing device 116 sends an activation notification message 308 to a provisioning service client 120 supported by host device 114. In some embodiments, message 308 may include any message or signal that electronically notifies provisioning service client 120 that computing device 116 has been powered on and/or activated in host device 114. Activation notification signal 308 may also include a device identifier key that uniquely identifies computing device 116.

In response to receiving activation notification message 308, provisioning service client 120 generates and sends a credential set request message 310 containing the device identifier key that identifies computing device 116 to credential manager 106 (e.g., via network 110).

In block 312, credential manager 106 uses the received device identifier key to access a credential data store to obtain the credential set data corresponding to computing device 116. In some embodiments, credential manager 106 may extract the device identifier key from credential set request message 310 and subsequently query the credential data store to obtain the credential set data mapped to the device identifier key. After locating and obtaining the correct credential set data from the credential data store, credential manager 106 generates and sends a credential set response message 314 to provisioning service client 120. In some embodiment, message 314 may contain the credential set data in plaintext format, which is extracted by provisioning service client 120. In other embodiments, the acquired credential set data may already be encrypted in the credential manager 106 with the public key previously provided by the customer to the manufacturer. If the credential data set is encrypted, provisioning service client 120 may then extract the credentials data set from message 314 using the customer private key and provide the acquired credential set data to computing device 116 (see signaling 316). For example, provisioning service client 120 may use the credential data set itself to authenticate computing device 116. In other embodiments, provisioning service client 120 may provide and/or display the credential data set to a user (e.g., a system administrator) who inputs the credentials into a UI associated with computing device 116.

In block 318, the credential set data is used to authenticate the computing device 116. In response, computing device 116 sends an authentication notification message 320 to provisioning service client 120 that indicates that the authentication process using the credential set data was successfully performed. Upon receiving notification message 320, provisioning service client 120 may be configured to reset or generate new credential set data (or alternatively, immediately prompt a user to reset the credentials) in accordance to a predefined customer credential security policy. For example, the credential security policy may require that each of the username and/or password be reset with a certain number and/or type of alphanumeric and punctuation characters. In some embodiments, provisioning service client 120 may subsequently provide the new credential set data to computing device 116 via message 322.

It will be appreciated that FIG. 3 illustrates an exemplary embodiment and that various devices, their locations, and/or their functions as described above in relation to FIG. 3 may be changed, altered, added, or removed.

Figure 4:
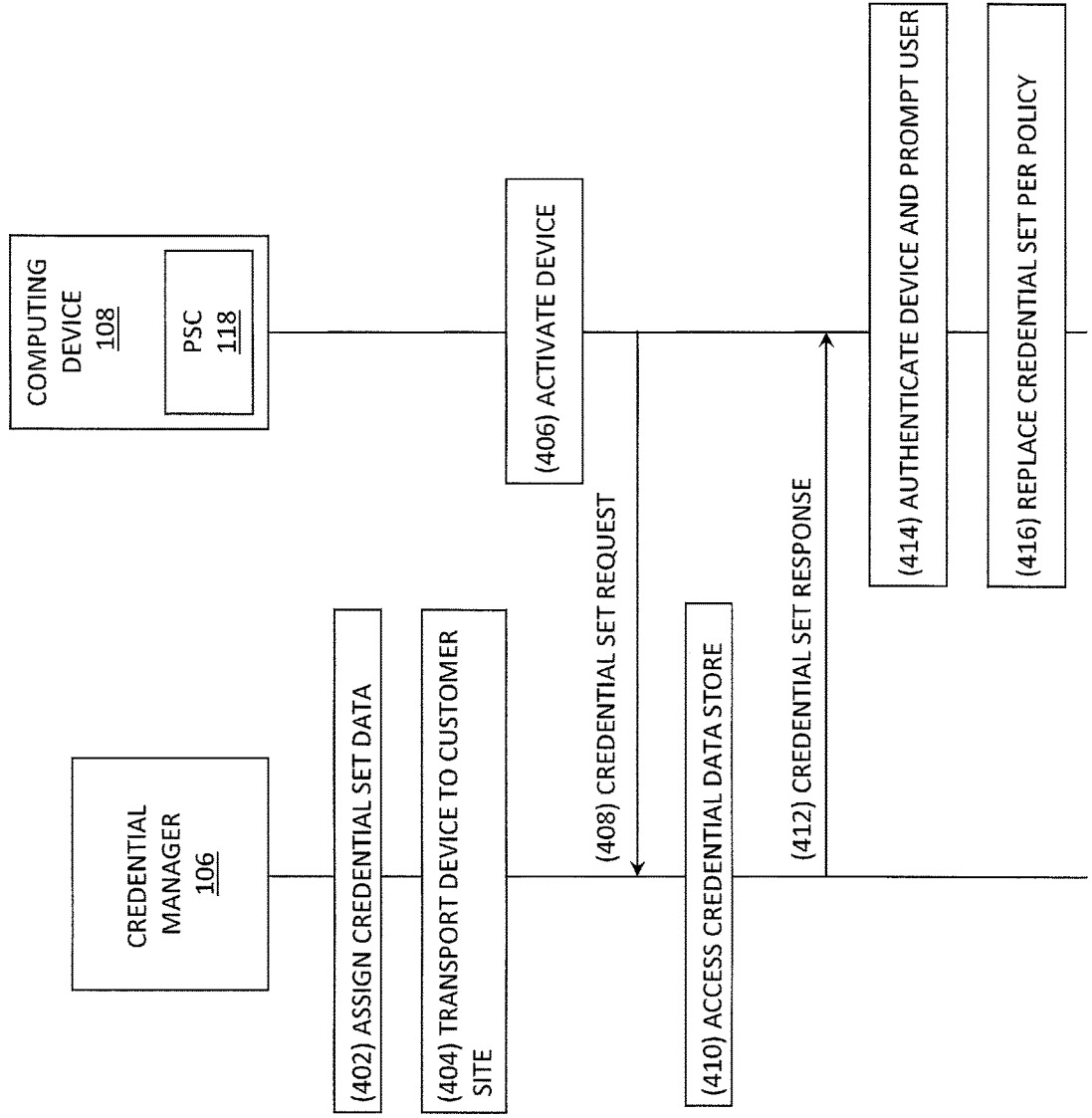
FIG. 4 illustrates exemplary signaling communications for securely establishing credential data by a computing device in accordance with embodiments of the subject matter described herein.

FIG. 4 exemplary signaling communications for securely establishing credential data for a computing device by a host device in accordance with embodiments of the subject matter described herein. In block 402, credential set data is assigned by credential manager 106 to a computing device 108, which is manufactured by a manufacturing entity associated with credential manager 106. In some embodiments, credential manager 106 may access and provision a credential data store with a database entry that maps the generated credential set data (e.g., a unique username and password combination) to a unique device identifier key that may comprise a combination (e.g., a concatenation) of the model number and serial number of computing device 108. In some embodiments, credential manager 106 may be configured to encrypt the credential set data with a public key provided by the customer before the credential set data is saved in the credential data store 112.

In block 404, computing device 108 is physically transported from the manufacturer's location to a customer location site. Notably, computing device 108 has not been programmed and/or provisioned with default credential set data (e.g., a default username and/or a default password) that may be improperly utilized by an unauthorized user or rogue software (e.g., while in transport to the customer location site via the supply chain or at the customer location site itself).

In block 406, computing device 108 is installed and/or incorporated into the customer user's network. Upon activation at the customer location site or facility, provisioning service client 120 in computing device 108 generates and sends a credential data request message 408 containing the device identifier key that identifies computing device 108 to credential manager 106 (e.g., via network 110).

In block 410, credential manager 106 uses the received device identifier key to access a credential data store to obtain the credential set data corresponding to computing device 108. In some embodiments, credential manager 106 may access and extract the device identifier key from credential set request message 408 and subsequently query the credential data store to obtain the credential set data mapped to the device identifier key. After locating and obtaining the correct credential set data from the credential data store, credential manager 106 generates and sends a credential set response message 412 to provisioning service client 118.

In block 414, the credential set data is used to authenticate the computing device 108. For example, provisioning service client 118 may extract the credentials data set from message 412 for subsequent authentication of computing device 108. In response to authenticating computing device 108, provisioning service client 120 may be configured to generate new credential set data (or alternatively, immediately prompt a user to reset the credentials) in accordance to a predefined customer security policy.

It will be appreciated that FIG. 4 illustrates an exemplary embodiment and that various devices, their locations, and/or their functions as described above in relation to FIG. 4 may be changed, altered, added, or removed.

Figure 5:
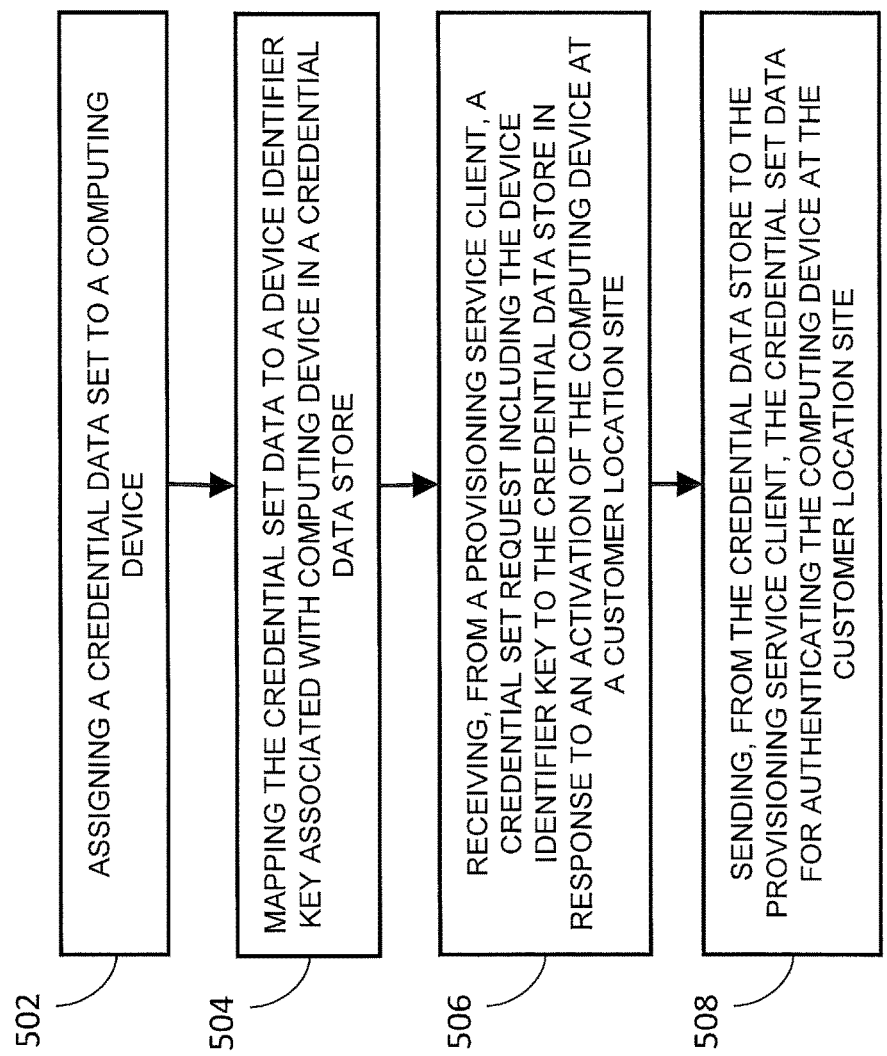
FIG. 5 illustrates a flow chart of an exemplary process for securely establishing credential data for a computing device in accordance with embodiments of the subject matter described herein.

FIG. 5 illustrates a flow chart of an exemplary process 500 for managing infrastructure elements in accordance with embodiments of the subject matter described herein. In block 502, credential set data is assigned to a computing device. In some embodiments, a credential manager associated with a manufacturer entity designates a username and password combination to a computing device manufactured at a related manufacturing site or facility. In some embodiments, each of the username and the password may include a random and unique combination of letters, numbers, and/or symbols.

In block 504, the credential set data is mapped to a device identifier key identifying the computing device in a credential data store. In some embodiment, a credential manager may create a database entry comprising a mapping between i) a device identifier key that uniquely identifies the computing device and ii) the designated username and password combination in a credential data store. In some embodiments, the device identifier key may be a combination of the model number and serial number of a particular computing device. Alternatively, the device identifier key may comprise a random and unique alphanumeric identifier that corresponds to a particular computing device.

In block 506, a credential set request message including the device identifier key is received from a provisioning service client. In some embodiments, the credential set request message is sent to the credential manager (and/or the credential data store) by a provisioning service client in response to the activation of the computing device at a customer location site.

In block 508, the credential set data is obtained and sent by the credential manager to the provisioning service client. For example, the credential manager generates a message that contains the credential set data obtained from the credential data store. In some embodiments, the credential set data is provided via a plaintext format. In other embodiments, the credential set data may be encrypted with a previously provided public encryption key associated with the customer user and/or the provisioning service client. The credential manager may then subsequently send the generated message containing the acquired credential set data associated with the computing device to the provisioning service client. The provisioning service client may subsequently decrypt (if necessary) and utilize the contained credential set data components to authenticate the computing device at the customer location site.

As indicated above, the subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions which, when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. As used herein, the terms "client" or "module" refer to hardware, firmware, or software in combination with hardware and/or firmware for implementing features described herein.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method comprising:
assigning, by a credential manager, credential set data to a computing device;
mapping the credential set data to a device identifier key associated with the computing device in a credential data store accessible by the credential manager;
receiving, from a provisioning service client in a host device, a credential set request message including the device identifier key by the credential manager in response to an activation of the computing device in the host device at a customer location site, wherein the credential set request message is sent from the provisioning service client to the credential manager in response to the provisioning service client receiving an activation notification message from the computing device upon the activation of the computing device; and
sending, by the credential manager to the provisioning service client in the host device, the credential set data for authenticating the computing device at the customer location site.

2. The method of claim 1 comprising prompting a user entity to reset the credential set data in accordance to an established security policy.

3. The method of claim 1 comprising deleting an entry containing the credential set data from the credential data store after the credential manager sends the credential set data to the provisioning service client.

4. The method of claim 1 comprising transporting the computing device from a manufacturer location site associated with the credential manager to the customer location site.

5. The method of claim 1 wherein the credential set data includes a unique username and a unique password solely associated to the computing device.

6. The method of claim 1 wherein the provisioning service client resides in at least one of the computing device and a host device supporting the computing device.

7. The method of claim 1 wherein the credential set data is provided to the provisioning service client in either a plaintext format or an encrypted format.

8. A system comprising:
at least one physical computer; and
a credential manager implemented using the at least one physical computers for performing operations comprising:
assigning credential set data to a computing device;
mapping the credential set data to a device identifier key associated with the computing device in a credential data store accessible by the credential manager;
receiving, from a provisioning service client in a hardware host device, a credential set request message including the device identifier key to the credential data store in response to an activation of the computing device in the host device at a customer location site, wherein the credential set request message is sent from the provisioning service client to the credential manager in response to the provisioning service client receiving an activation notification message from the computing device upon the activation of the computing device; and
sending, to the provisioning service client in the hardware host device, the credential set data for authenticating the computing device at the customer location site.

9. The system of claim 8 wherein the provisioning service client is further configured to prompt a user entity to reset or replace the credential set in accordance to an established security policy.

10. The system of claim 8 wherein the credential manager is further configured to delete the credential set data from the credential data store after the credential manager sends the credential set data to the provisioning service client.

11. The system of claim 8 wherein the computing device is transported from a manufacturer location site associated with the credential manager to the customer location site.

12. The system of claim 8 wherein the credential set data includes a unique username and a unique password solely associated to the computing device.

13. The system of claim 8 wherein the provisioning service resides on at least one of a computing device and a host device supporting the computing device.

14. The system of claim 8 wherein the credential set data is provided by the credential manager to the provisioning service client in either a plaintext format or encrypted format.

15. A non-transitory computer readable medium having stored thereon executable instructions which, when executed by a processor of a computer, cause the computer to perform steps comprising:
assigning, by a credential manager, credential set data to a computing device;
mapping the credential set data to a device identifier key associated with the computing device in a credential data store accessible by the credential manager;
receiving, from a provisioning service client in a host device, a credential set request message including the device identifier key by the credential manager in response to an activation of the computing device in the host device at a customer location site, wherein the credential set request message is sent from the provisioning service client to the credential manager in response to the provisioning service client receiving an activation notification message from the computing device upon the activation of the computing device; and
sending, by the credential manager to the provisioning service client in the host device, the credential set data for authenticating the computing device at the customer location site.

16. The computer readable medium of claim 15 comprising prompting a user entity to reset the credential set data in accordance to an established security policy.

17. The computer readable medium of claim 15 comprising deleting an entry containing the credential set data from the credential data store after the credential manager sends the credential set data to the provisioning service client.

18. The computer readable medium of claim 15 comprising transporting the computing device from a manufacturer location site associated with the credential manager to the customer location site.

19. The computer readable medium of claim 15 wherein the credential set data includes a unique username and a unique password solely associated to the computing device.

20. The computer readable medium of claim 15 wherein the provisioning service client resides on at least one of the computing device and a host device supporting the computing device.

* * * * *